Figure 9:
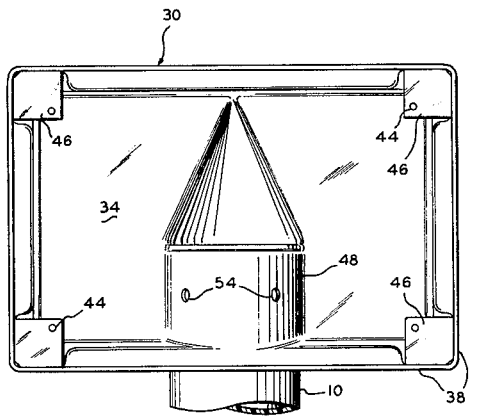

Sept. 7, 1965 R. L. WHITMAN 3,204,355
NONMETALLIC PIPELINE MARKER
Filed Nov. 30, 1960 3 Sheets-Sheet 1
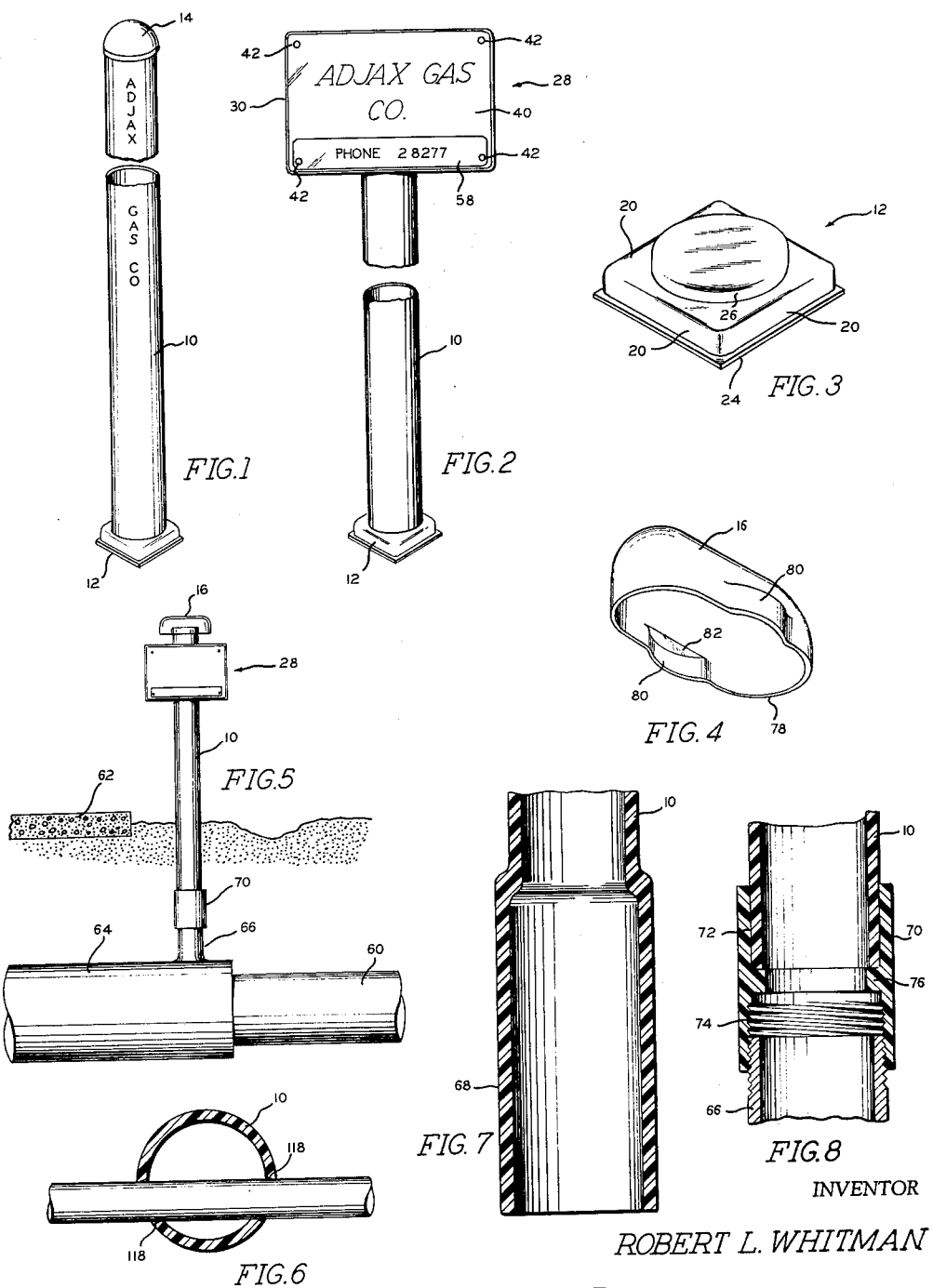
INVENTOR
ROBERT L. WHITMAN
BY Beaman & Beaman
ATTORNEY Sept. 7, 1965 R. L. WHITMAN 3,204,355
NONMETALLIC PIPELINE MARKER
Filed Nov. 30, 1960 3 Sheets-Sheet 2

INVENTOR
ROBERT L. WHITMAN
BY Beaman & Beaman
ATTORNEY

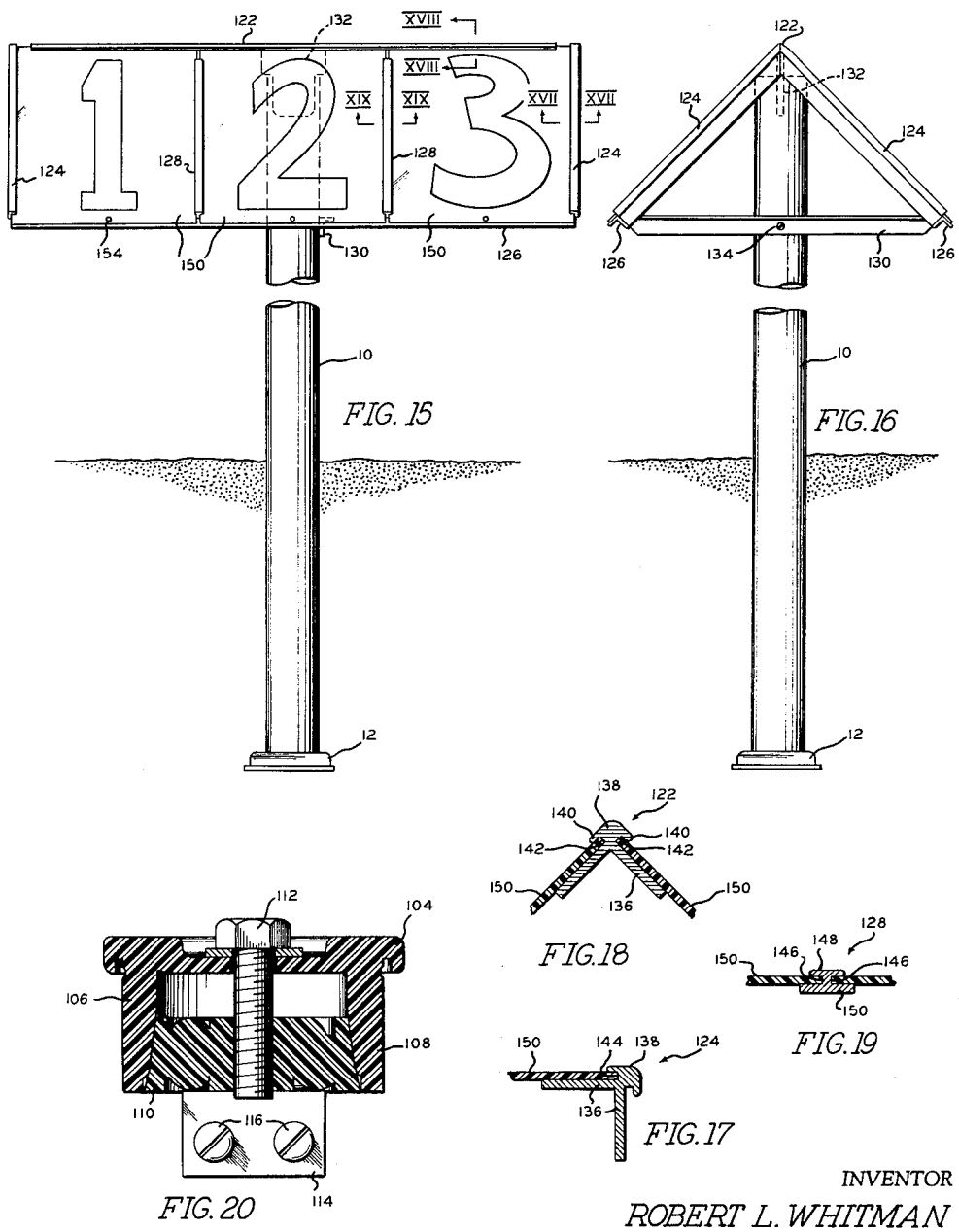

United States Patent Office 3,204,355
Patented Sept. 7, 1965

3,204,355
NONMETALLIC PIPELINE MARKER
Robert L. Whitman, Jackson, Mich., assignor to Handley Industries, Inc., Jackson, Mich., a corporation of Michigan
Filed Nov. 30, 1960, Ser. No. 72,686
4 Claims. (Cl. 40—10)

The invention relates to markers used with buried apparatus such as pipelines, conduits, or the like and particularly pertains to pipeline marker posts and signs constructed from relatively inert, lightweight, nonmetallic materials.

It is common practice to mark pipelines, such as those used to transport fluids, natural gas or conduits containing telephone lines with signs or posts whereby the lines may be easily located or serve as a warning to persons digging in the vicinity. Such markers are usually used whenever a pipeline or conduit passes beneath a roadbed and are also employed adjacent fence lines and in isolated areas for the purpose of locating and inspecting the pipeline.

In the past, it has been the practice to manufacture marker posts, sign holders, vents, etc., as used with pipelines, from metal, such as steel or aluminum and consequently, such devices have required painting and occasional maintenance to keep them in proper condition. Steel markers are relatively heavy and thus, expensive to ship and transport and though aluminum markers require less maintenance than those of steel, they are more expensive to manufacture. Also, such markers and signs often encounter severe abuse from vandals and hunters, who often make the markers the target for marksmanship. Enameled steel and aluminum markers, when struck by a shotgun or a rifle, often shatter wherein the marker becomes practially useless for its purpose.

It is, therefore, an object of the invention to provide a pipeline marker and vent structure, which is constructed from a nonmetallic, lightweight, relative inert material which is easily moldable such that a substantially shatterproof and strong marker may be economically produced.

A further object of the invention is to provide a pipeline marker of nonmetallic material which is of relatively simple construction, attractive in appearance and requires little or no maintenance to maintain the marker in first class condition.

Yet another object of the invention is to provide a pipeline marker post upon which a sign may be attached and wherein a vent may be employed with the post without modification thereto.

Another object of the invention is to provide a nonmetallic pipeline marker post having a plurality of accessories which may be selectively used therewith wherein the marker may be employed for cathodic protection, as a vent, as a combination sign holder and vent, or a sign holder, or may be used as merely a post upon which identification may be placed.

A further object of the invention is to provide a pipeline marker of economical production which may be viewed during aerial inspection of the pipeline wherein the indicia thereon will be easily visible and easily changed, if desired.

Figure 10:
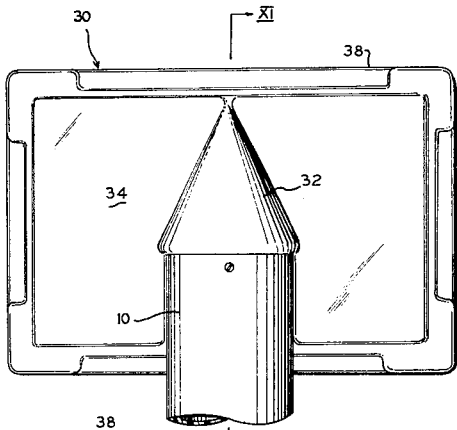
Figure 12:
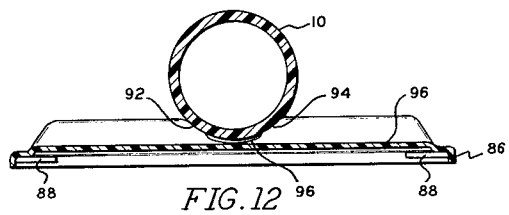
Figure 11:
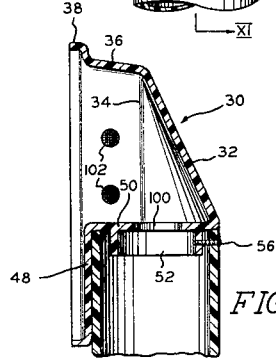
Figure 13:
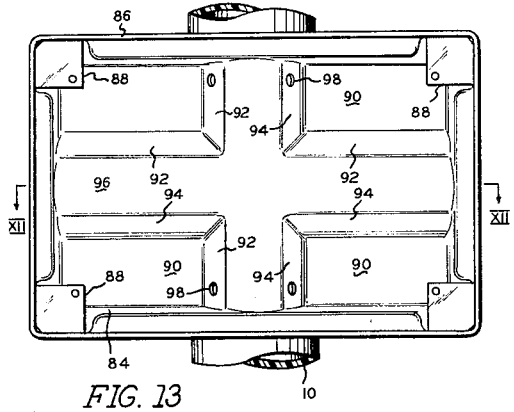
Figure 14:
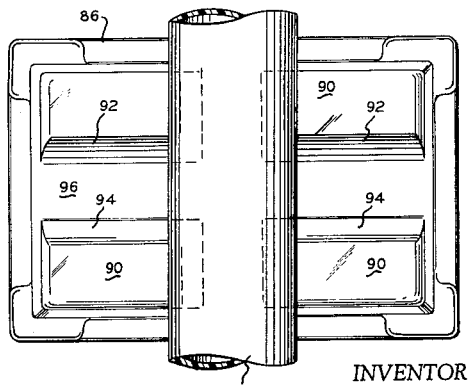

These and other objects of the invention arising from the details and relationships of components of embodiments thereof will become apparent from the following description and accompanying drawings wherein:

FIG. 1 is a perspective elevational view of a pipeline marker post in accord with the invention having a cap cemented thereto, FIG. 2 is an elevational perspective view of a pipeline marker in accord with the invention having a sign affixed to the upper region thereof, FIG. 3 is an elevational perspective view of the base employed with the marker post, FIG. 4 is an underside perspective view of the vent cap which may be employed with the invention, FIG. 5 is an elevational view, partly in section, of the invention, showing a marker post, sign and vent as employed with a casing, FIG. 6 is a transverse sectional view of a marker post having a rung bar mounted therein, FIG. 7 is an elevational sectional view of the lower end of a marker post as "belled" when used with a casing, FIG. 8 is an elevational view of a coupling which may be employed with the marker post when used with a casing, FIGS. 9 and 10 are front and back elevational views, respectively, of a top mounted sign holder which may be employed with the pipeline marker post in accord with the invention, FIG. 11 is a sectional view of the sign holder taken along XI—XI of FIG. 10, FIG. 12 is a plan sectional view of another embodiment of the sign holder, as assembled to a marker post taken along section XII—XII of FIG. 13, FIGS. 13 and 14 are front and back views, respectively, of the sign holder of FIG. 12, FIGS. 15 and 16 are side and end elevational views, respectively, of an embodiment of an aerial pipeline marker in accord with the invention, FIGS. 17 through 19 are sectional detailed views taken along sections XVII—XVII, XVIII—XVIII, and XIX—XIX of FIG. 15, and FIG. 20 is an elevational sectional view of a cathodic terminal cap which may be employed with the marker post of the invention.

The basic components of the invention consist of the marker post 10, which is of tubular form, a base member 12, standard and vent caps 14 and 16, respectively, sign holders, sign plates, and a cathodic cap 18. It is preferred that all of these components be formed, except for the few metallic elements, of a relatively inert, lightweight, strong synthetic material, such as a resin-rubber compound such as a blend of copolymers styrene-acrylonitrile resin and butadiene-acrylonitrile rubber, as is available under the name Kralastic or Cycolac.

The pipeline marker in its most simple form takes that shown in FIG. 1 wherein the post or tube 10 has a semi-spherical cap 14 mounted upon the upper end thereof and a base 12 is cemented to the lower end of the post. The base 12 is best shown in FIG. 3 and consists of a substantially rectangular form having a radial portion 20 and axial portions 22. The axial portions 22 are planar and define a rectangle, preferably a square. An outwardly radially extending flange 24 is defined on the peripheral edge of the portions 22. An upwardly extending circular boss 26 is defined upon the radial portion 20 which is received within the bore of the tube and upon the application of bonding cements or solvents, the base may be firmly affixed to the post. The marker post 10 is normally of approximately 7 feet in length wherein 3 or more feet of the lower region of the post are imbedded in a hole in the ground. The name of the pipeline, telephone or utility company owning the submerged structure may be placed upon the post. In that the radial portion 20 of the base 12 extends laterally from the configuration of the post and the portions 22 are noncircular, the base effectively prevents the post from being rotated or pulled from the ground.

Another embodiment of the marker is shown in FIG. 2 wherein a marker post and base similar to that of FIG. 1 is employed, however, a sign, generally indicated at 28 is affixed to the upper regions of the post consisting of a sign holder which supports a sign plate having suitable information thereon. The sign illustrated in FIG. 2 is of the type shown in FIGS. 9 through 11. Referring to FIGS. 9 through 11 it will be observed that the sign holder 30 is of a relatively rectangular elevational configuration being of a dish-like three dimensional shape having a rain-shed portion 32 defined on the back wall 34 thereof. The rear wall 34 of the sign holder 30 is substantially planar having edge portions 36 extending forwardly from the periphery of the back. The edge portions 36 are formed with a flange 38 near the outer end thereof which defines a recess to receive a planar sign plate 40, FIG. 2, upon which the desired information may be stenciled or otherwise placed. The sign plate is maintained within the flange peripheral portion by suitable rivets 42, FIG. 2, extending through holes in the sign plate and holes 44 defined in inserts 46 which may be either molded into the sign holder or cemented therein adjacent the peripheral sign holder flange. The lower central region of the back wall portion of the sign holder is recessed inwardly, toward the front of the sign holder, in a cylindrical configuration at 48 and a horizontal planar portion or cap area is defined at 50 which extends from the upper edge of the cylindrical portion 48 to the lower edge of the rain-shed portion 32. It will be noted that the rain-shed portion 32 is of semiconical configuration extending outwardly from the back portion wherein upon placing the end of the post against the underside of the cap portion 50 the entire upper end of the post will be covered by the portion 50 and the sign holder rain-cap portion and rear configuration of the sign holder will blend into the configuration of the post in an attractive manner. A cylindrical downwardly extending flange portion 52 is defined upon the cap portion 50 which extends into the upper end of the post. The sign holder 30 may be affixed to the post 10 by means of a pair of screws extending through holes 54 defined in cylindrical portion 48 of the sign holder which screw into the post itself and the screw 56 extending through the rear of the post, FIG. 11 may be employed to screw into the cylindrical flange 52.

Referring to the sign plate 40, as shown in FIG. 2, the sign plate may consist of a planar rectangular member upon which the indicia or information is provided. In that pipeline companies and the like often refer to different phone numbers for contact in different localities, it is contemplated that the phone number portion of the plate may be upon a separate portion 58 which is attached to the primary sign portion 40 by the same rivets which affix the primary sign portion thereto. Thus, a single primary sign may be furnished with the sign holder and only the sign portion 58 need be marked in accord with the locality with which the marker is employed. It will be understood that it is the intention of the invention to employ the same or similar material in making the sign plates as in the marker posts.

In the passing of pipeline conduits under roadbeds, it is common practice to encase the pipeline within a casing and vent the casing whereby leaks occurring in the pipeline may be detected. It is contemplated that the invention be adaptable to this type of structure and referring to FIG. 5, a pipeline 60 is shown extending under a roadbed 62. A casing member 64 of tubular configuration surrounds the pipeline 60 and is provided with a tubular stack portion 66 extending upwardly therefrom. Normally, the casing would be of conventional construction of steel or the like and the stack structure would be of similar material. The pipeline marker post 10 in accord with the invention may be attached to the end of the stack 66 as shown in FIG. 5. Two means of attaching the pipeline marker to the stack are shown in FIGS. 7 and 8. In the embodiment of FIG. 8, the lower end of pipeline marker is belled outwardly at 68 to a greater diameter than the remainder of the pipeline marker post 10 whereby the belled portion 68 may be slipped over the end of the stack 66 in telescoping relationship. In FIG. 8, a coupling 70 is shown for use with threaded stacks and has a cylindrical recess 72 into which the lower end of the marker is inserted and bonded. The lower end of the coupling is provided with threads 74 for engagement with threads formed upon the stack. An annular stop shoulder 76 is defined in the coupling 70 to insure that the pipeline marker and stack extend substantially equal axial distances into the coupling.

In the embodiment of FIG. 5, it is necessary to employ vent means with the pipeline marker wherein gases escaping into the casing may be vented to the atmosphere. To this end, a nonmetallic vent cap 16 of the type shown in FIG. 4 may be employed. Cap 16 is preferably constructed of the same material as the pipeline marker post and consists of a dish-like member of elongated configuration having an open bottom at 78. Cylindrical portions 80 are defined on opposite sides of the cap being molded into the configuration thereof and including stop surfaces 82 wherein the cap may be inserted over the end of the pipe until surfaces 82 rest upon the end thereof, thus, clearance is provided between the top of the cap and the top of the pipe whereby the gases may flow out of the pipe and under the cap to the atmosphere, yet rain and snow will not enter the post. The cap is bonded to the top of the pipeline post by means of cement applied to the inner surfaces of the cylindrical portions 80.

Another embodiment of the sign holder which may be employed with the pipeline post in accord with the invention is shown in FIGS. 12 through 14. This type of sign holder is shown used in conjunction with the pipeline marker post illustrated in FIG. 5. The sign holder of FIGS. 12 through 14 is of a generally dish-like configuration having a rear wall 84 having peripheral portions 86 extending at right angles to the plane of the back portion. Inserts 88 are fixed within the sign holder, as shown in FIG. 13, having holes therein for receiving the rivets to maintain the sign plate in position. As will be apparent, the sign holder of FIGS. 12 through 14 is of rectangular front elevational configuration having a greater dimension in one direction than the other and the back wall portion 84 is defined by four portions 90. The portions 90 define a valley configuration as shown in FIG. 12 therebetween. The valley being defined by portions 92 and 94 which together define a cylindrical recess portion of one dimension, a portion 96 defining a second cylindrical portion of a second dimension and the intersection of the portions 92 and 94 defines rib portions 98 which would engage with a cylindrical pipe dimension which would not coincide with the cylindrical surfaces 92–94. Thus, the portions 90 and the valley defined therebetween permit the sign holder to be aligned upon the post whereby one of the valleys will be parallel to the post and the other will be at right angles thereto. The sign of FIGS. 12 through 14 is shown as mounted upon the post 10 wherein the major dimension of the sign holder extends transversely to the axis of the post and the post dimension is such as to engage with the cylindrical portion 92–94 of the sign holder. Screw holes 98 are provided in the cylindrical surfaces 92–94 which will be engaging the sign post to receive screws which affix the sign post to the associated marker post.

It is contemplated that the sign holder of FIGS. 9 through 11 may also be used with a vented marker of the type shown in FIG. 5. To this end, a hole 100 is provided in the cap portion 50 of the sign holder 30 and holes 102 are defined in the vertically extending sign holder edge portions 36 and screening may be used to cover the holes. Thus, the sign holder will define a chamber into which the gases flowing up the marker posts may flow into the sign holder and escape through the vents 102.

It is occasionally desired that pipeline markers be employed as terminal locations to test the cathodic protection employed with pipelines and this end, a cap 18 of the type shown in FIG. 20 may be used with the pipeline marker post 10. The cap of FIG. 20 consists of a body member having a cylindrical peripheral portion 104 which fits over the top of the post 10 having an annular undercut portion into which the upper end of the post is received. The cap includes an axially extending portion 106 which is received within the pipe post bore and the portion 106 has fingers 108 which are radially expandable under the influence of an axially movable wedge member 110. A screw 112 extending through the top of the cap threads into the wedge member 110 causing the wedge member to be drawn toward the upper region of the cap upon rotation of the screw and expand the fingers 108 radially outwardly under the influence of the wedge surfaces formed upon the wedge member. Thus, the cap may be securely affixed to the upper end of the bore. An insulated plate 114 is cemented to the wedge member having a pair of terminals 116 thereon to which the cathodic test wires may be affixed. The entire cap 18, except for the screw 112 and terminals 116, is preferably constructed of the same material as the pipeline marker posts, sign holders, etc. and is somewhat similar to the cathodic protection caps employed in the assignee's copending U.S. application No. 719,185, now U.S. Patent No. 3,055,970.

In that pipeline markers are often employed adjacent fence lines, it is of convenience to incorporate fence climbing means with the pipeline marker and to this end, a rung member may be affixed to the pipeline marker. When used in this manner, the pipeline marker post, of the embodiment of that of FIG. 1 usually, is mounted within the ground wherein the fence line is immediately adjacent to the marker. A pair of radial holes 118 are formed in the marker post in the same horizontal plane and a rung member 120 of linear configuration, usually consisting of an aluminum tube, is inserted through the holes 118. The holes 118 may be so located that one end of the rung member extends through one side of the fence and the other end of the rung member is accessible from the other fence side whereby the pipeline inspector may climb one side of the rungs, throw his leg over the side of the fence and climb down the other side of the rungs on the other side of the fence. The holes 118 are defined whereby the axis of the holes intersect at an included angle less than 180°, the holes being slightly greater in diameter than the rung member and upon inserting the rung member through the holes, the fact that the edges of the holes engage the rung member a wedging action is produced which will securely hold the rung member in position without the aid of additional affixing means. By way of example, the holes 118 may be of a diameter of 1.062 inches and the rung member of an outer diameter of 1.050 inches.

Pipelines are often inspected by means of aircraft and to this end, the nonmetallic lightweight pipeline marker post in accord with the invention may be also adapted for use with aerial markers. Referring to FIGS. 15 through 17, it will be noted that a post 10 of the type of FIG. 1, except no cap 14 is employed therewith, is mounted in the ground in a vertical position. The upper end of the post is provided with a substantially inverted V-shaped aluminum framework consisting of an upper ridge member 122, downwardly extending edge members 124 which are affixed to the ridge member and are affixed at the lower edge by angle members 126. Intermediate members 128 are located between the edge members 124 whereby each side of the aerial marker sign is divided into three sections. An angle member 130 extends between the angle members 126 across the base of the sign adjacent to the marker post 10 and an insert 132 is mounted upon the central lower portion of the ridge member 122 and extends into the upper end of the marker post. Thus, by employing a screw 134 to affix the angle 130 to the post 10, the aerial framework may be secured to the top of the marker post.

The configuration of the ridge member 122 is shown in section in FIG. 18 and includes a V-shaped portion 136 having a cap 138 thereon including overlapping lips 140 which define linear recesses 142. The edge members 124 are shown in FIG. 17 and are similar to the members 122 and define a side recess 144. The members 128 extending from the ridge members 122 and angle members 126 are of T configuration wherein opposed linear recesses 146 are defined between a cap 148 and a base 150. It will thus be appreciated that a planar sign plate 152 may be inserted upwardly into the recesses 144 and 146 defined by the members 124 and the members 128 or by the members 128. The sign plates may be slid into these recesses until they engage with the recesses 142 and a screw 154 extending through the sign plates into the angle members 126 will maintain the sign plates in position. By having sign plates having standard numerals thereon, the desired numeral sign plates may be inserted to produce the desired number. It will be appreciated that sign holder frameworks may be constructed for 1, 2, 4, etc. digit numbers by employing similar constructional concepts. The resultant marker is easily observed from the air in that the planes of the sign plates on each side of the sign are at substantially 45° to the horizontal.

It will, therefore, be appreciated that the invention contemplates a pipeline marker of lightweight, relatively inert construction which is very strong and is not subject to many of the disadvantages of the more conventional pipeline markers of metal. With the use of the resin-rubber compound of the desired embodiment, the painting of colors upon the sign plate, post, sign holders, etc. provide a very strong bond in that the paint performs a chemical bonding action with the material of the components superior to the bonding produced with metallic articles therein requiring less maintenance. The post will not be damaged by the soil conditions and a long life is insured.

It is intended that the invention not be limited to the described embodiments and that the scope of the invention be defined only by the following claims.

I claim:

1. A pipeline marker comprising, in combination, a cylindrical vertically disposed post, a sign holder mounted upon said post, said sign holder comprising a recessed, dish-like body member formed from a sheet of nonmetallic, relatively inert, moldable material, said body member including an integral back portion and sign plate positioning means, a sign plate attached to said body member, a pair of spaced parallel elongated convex ridges integrally defined on said back portion from the material thereof defining an elongated recess therebetween and a cylindrical surface portion defined on each of said ridges, said surface portions being concentric and of equal radius and spaced relative to each other in opposed relation and constituting a portion of said recess, said post being received within said recess and fastener means affixing said body member to said post.

2. In a pipeline marker as in claim 1 wherein first and second recesses are defined on said body member back portion, said recesses being perpendicularly disposed to each other.

3. In a pipeline marker as in claim 1 wherein said sign plate constitutes an enclosure of the recessed configuration of said body member, inserts having fastener receiving holes defined therein mounted within said body member and fasteners attaching said sign plate to said inserts.

4. A sign holder adapted to be affixed to a substantially vertical, cylindrical, tubular post, said holder comprising a recess body member molded from a sheet of nonmetallic, relatively inert, thermoplastic material, said body member being of a dish-like configuration having a nonplanar back portion, a sign plate affixed to said body member and in spaced relation to said back portion, a pair of spaced, parallel, elongated convex ridges defined on said back portion, an elongated concave cylindrical surface defined upon each of said ridges, said concave surfaces of said ridges being concentric and of equal radius, a cylindrical concave portion defined on said back portion intermediate and intersecting said cylindrical concave surfaces and of a different radius than said surfaces, said concave portion and cylindrical surfaces having parallel axes and forming spaced, parallel, elongated ribs at their locations of intersection, said concave surfaces and portion defining a valley adapted to receive said post.

References Cited by the Examiner

UNITED STATES PATENTS

| | | | |
|---|---|---|---|
| 899,349 | 9/08 | Steiber | 189—38 |
| 965,566 | 7/10 | Cooley | 40—145 |
| 973,615 | 10/10 | Barrick | 189—38 |
| 1,004,188 | 9/11 | Olds. | |
| 1,203,429 | 10/16 | Stonehouse | 40—145 |
| 2,025,004 | 12/35 | Shearer | 40—145 |
| 2,187,286 | 1/40 | Tillman | 182—194 |
| 2,193,747 | 3/40 | Thompson | 40—145 X |
| 2,330,080 | 9/43 | Palmer | 40—19 |
| 2,467,908 | 4/49 | Rand | 40—145 X |
| 2,617,215 | 11/52 | Morris | 40—145 X |
| 2,625,760 | 1/53 | Cleal | 40—19 |

FOREIGN PATENTS 907,893   7/45   France.

JEROME SCHNALL, *Primary Examiner.*

E. V. BENHAM, *Examiner.*